(12) United States Patent
Kojima

(10) Patent No.: US 8,897,767 B2
(45) Date of Patent: Nov. 25, 2014

(54) PARAMETER SETTING APPARATUS AND PARAMETER SETTING METHOD

(71) Applicant: Fujitsu Limited, Kawasaki-shi, Kanagawa (JP)

(72) Inventor: Yuji Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 157 days.

(21) Appl. No.: 13/627,344

(22) Filed: Sep. 26, 2012

(65) Prior Publication Data

US 2013/0122885 A1 May 16, 2013

(30) Foreign Application Priority Data

Nov. 14, 2011 (JP) ................... 2011-248944

(51) Int. Cl.
*H04W 24/00* (2009.01)
*H04W 24/02* (2009.01)
*G05B 23/02* (2006.01)

(52) U.S. Cl.
CPC ........... *H04W 24/02* (2013.01); *G05B 23/0251* (2013.01)
USPC .......................................... 455/424; 455/418

(58) Field of Classification Search
CPC ... H04W 24/02; H04W 24/04; G06K 9/6251; G05B 23/0251; G05B 23/02
See application file for complete search history.

(56) References Cited

U.S. PATENT DOCUMENTS

| 2005/0041584 | A1* | 2/2005 | Lau et al. ..................... 370/235 |
| 2007/0036339 | A1 | 2/2007 | Cioffi et al. |
| 2009/0187641 | A1* | 7/2009 | Li et al. ....................... 709/220 |

FOREIGN PATENT DOCUMENTS

| JP | 2008-269215 | 11/2008 |
| JP | 2008-546297 | 12/2008 |
| JP | 2010-166185 | 7/2010 |

* cited by examiner

*Primary Examiner* — Vladimir Magloire
(74) *Attorney, Agent, or Firm* — Staas & Halsey LLP

(57) ABSTRACT

A parameter setting apparatus includes a memory, and a processor that executes a procedure in the memory, the procedure including, selecting and executes one of a plurality of optimization operations to optimize a control parameter of a mobile communication network in accordance with a common value function, in response to a state variable in each of a plurality of different areas in the mobile communication network, the common value function determining an action value of each optimization operation responsive to the state variable of the mobile communication network, determining a reward responsive to the state variable in each of the plurality of areas, and performing reinforcement learning to update the common value function in response to the reward determined on each area.

14 Claims, 17 Drawing Sheets

FIG. 4

| STATE st | | | | ACTION at | Q (s,a) |
|---|---|---|---|---|---|
| STATE COMPONENT st1 | STATE COMPONENT st2 | STATE COMPONENT st3 | ... | | |
| 1a | 2a | 3a | ... | ac1 | 1 |
| | | | | ac2 | 0.5 |
| 1a | 2a | 3b | ... | ac1 | 0.1 |
| ... | ... | ... | ... | ... | ... |

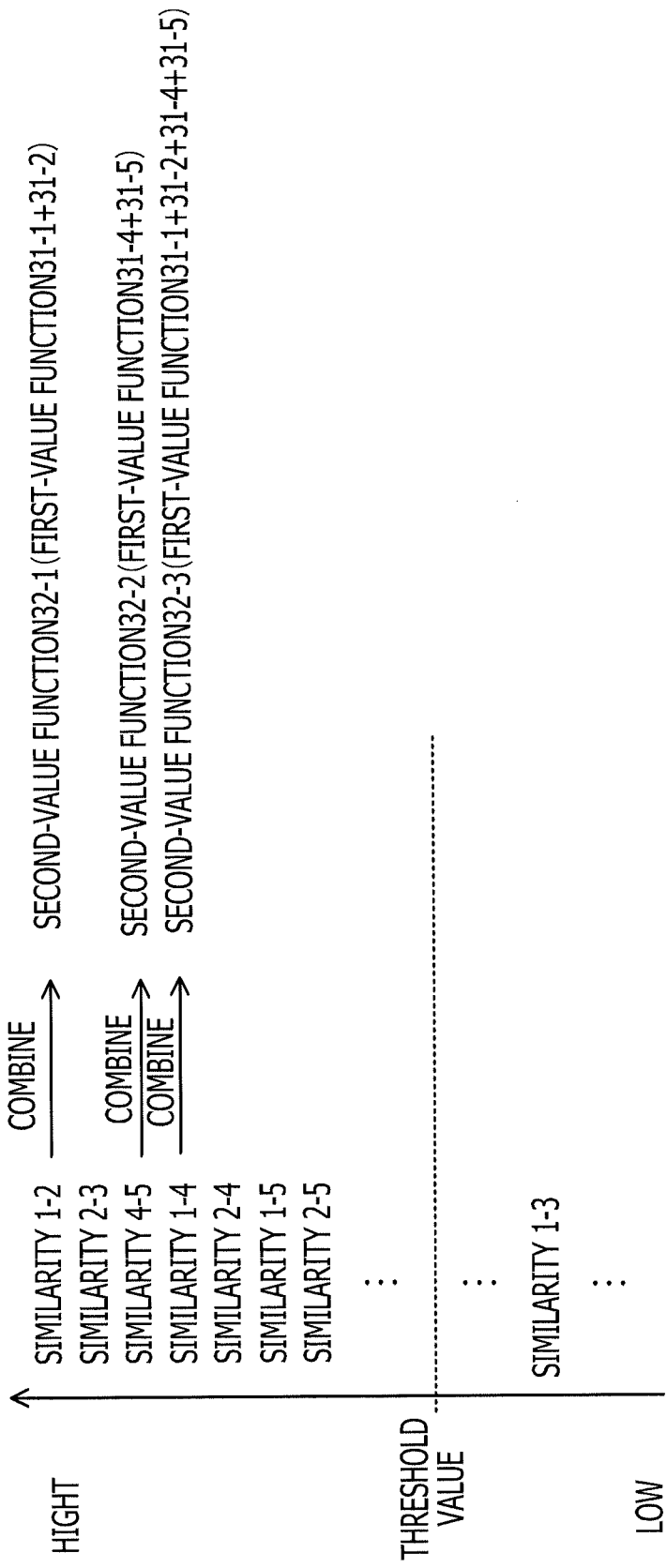

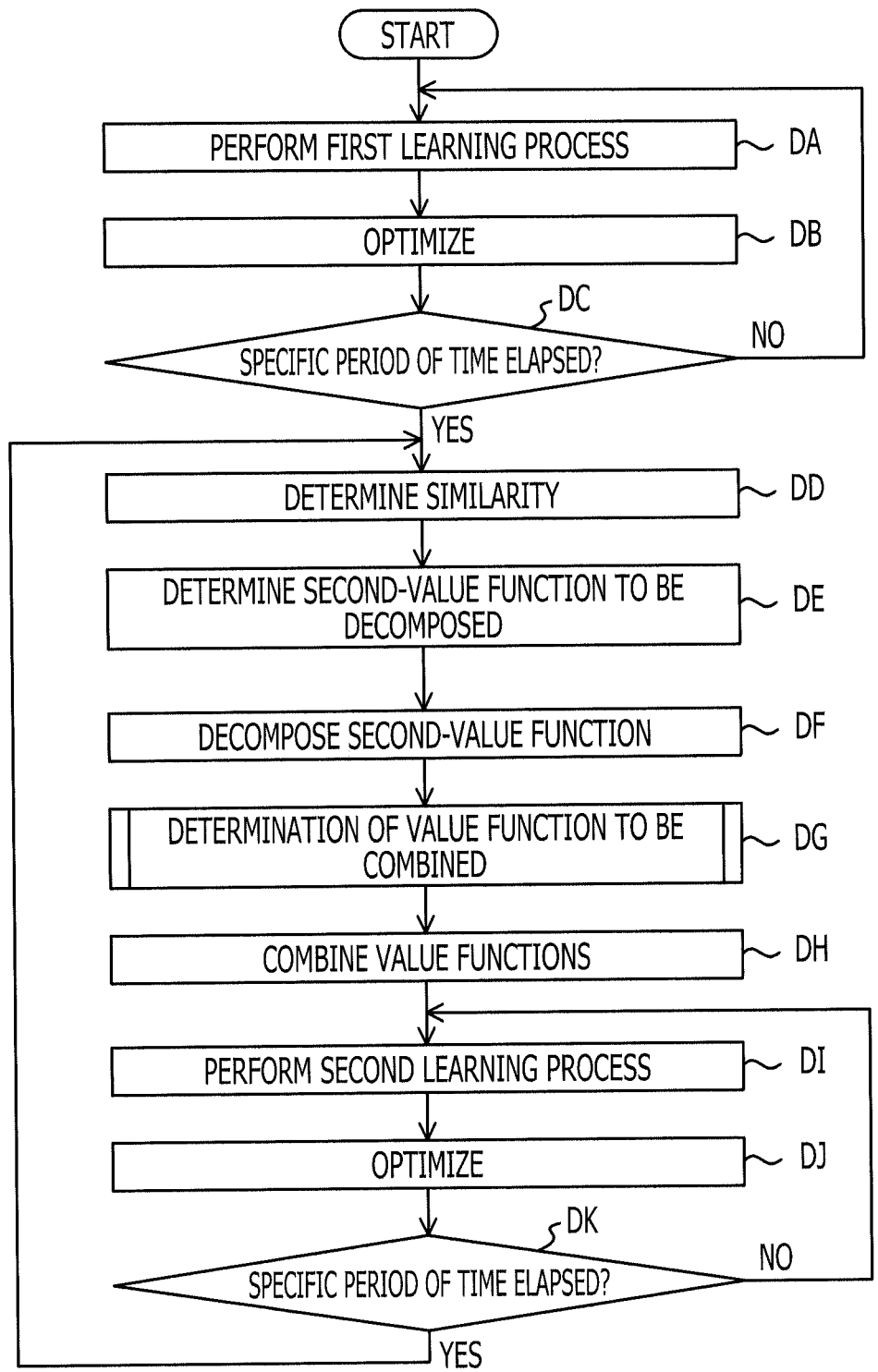

PARAMETER SETTING APPARATUS AND PARAMETER SETTING METHOD

CROSS-REFERENCE TO RELATED APPLICATION

This application is based upon and claims the benefit of priority of the prior Japanese Patent Application No. 2011-248944, filed on Nov. 14, 2011, the entire contents of which are incorporated herein by reference.

FIELD

The embodiments discussed herein are related to a parameter setting apparatus, a parameter setting method, and computer-readable recording medium storing a program that causes a computer to set a control parameter.

BACKGROUND

The application of self-organizing network (SON) is studied. The SON automatically optimizes a control parameter of each apparatus in a mobile communication network. Long term evolution (LTE) that is standardized in a third generation partnership project (3GPP) is available as a standard of the mobile communication network where the application of the SON is studied. A variety of use cases of the SON to optimize the control parameter has been under study.

An optimization algorithm called reinforcement learning is known as a type of machine learning. In the reinforcement learning, an agent learns from an interaction with an environment by referencing a state variable of the environment, and improves a policy so that a total amount of reward finally gained is maximized.

A method to control an operation of a first digital subscriber line (DSL) including at least one DSL line is known in the related art. This method includes providing a control DSL line set including at least one DSL line, causing the control DSL line set to operate using a first value in a control parameter vector in a subset of the control DSL line set, collecting operating data related to the operation of the control DSL line set where the first value of the control parameter vector in the subset of the control DSL line set is used, analyzing the collected operating data, and adjusting a value of at least one control parameter of at least one line of the first DSL line set. The analyzing of the collected operating data includes classifying the collected operating data into a plurality of clusters, evaluating a performance measurement criterion in each of the clusters, selecting a first cluster in accordance with the performance measurement criterion of the first cluster, and updating the value of the control parameter vector of the control DSL line set so that the value of the control parameter vector matches the value of the control parameter vector of the selected cluster.

An electric field intensity estimation device that estimates a reception electric field intensity at a given point is available in the related art. The electric field intensity estimation device includes a preliminary estimation unit that determines a pre-correction electric field intensity estimated value from a geographical value indicating a geographical calculation condition at the given point, and a neural network processor that calculates an output value of a neural network having an input layer, at least one intermediate layer, and an output layer, and updates weighting coefficients. In an estimation mode, the geographical value is used as an input value to the input layer, a correction value is calculated in accordance with an output value output from the output layer, and the correction value and the electric field intensity prior to correction are summed. The electric field intensity estimation device thus calculates and outputs a corrected electric field intensity estimation value. In a learning mode, the electric field intensity estimation device sets, as an output value of the output layer, an error between a correction value calculated in the estimation mode and a target correction value. The target correction value is a difference between the pre-correction electric field intensity estimation value and an actual measurement value. The neural network processor updates the weighting coefficients through backpropagation.

Also available in the related art is a characteristic pattern detection system that includes a model learning apparatus that learns a model in a sensor network as a network having a sensor, and a characteristic pattern detection apparatus that acquires a measurement value characteristic of the senor network. The model learning apparatus receives, from a measurement value database, data of the measurement value of each sensor installed in the sensor network, determines a parent sensor group from the measurement data and a prior knowledge relating to a sensor retrieved from a prior knowledge database, determines a statistical parameter of a sensor measurement value based on a reliance relationship between the determined sensor and the parent sensor group, and then transmits the statistical parameter to the characteristic pattern detection apparatus. The characteristic pattern detection apparatus receives from the measurement value database a measurement pattern that is measurement data at a measurement time serving as a characteristic pattern detection target, and determines a characteristic of the received measurement pattern using information relating to the parent sensor group and the statistical parameter to detect a fault.

SUMMARY

According to an aspect of the invention, a parameter setting apparatus includes a memory, and a processor that executes a procedure stored in the memory, the procedure including, performing a process of selecting and executing one of a plurality of optimization operations to optimize a control parameter of a mobile communication network in accordance with a common value function, in response to a state variable in each of a plurality of different areas in the mobile communication network, the common value function determining an action value of each optimization operation responsive to the state variable of the mobile communication network, determining a reward responsive to the state variable in each of the plurality of areas, and performing reinforcement learning to update the common value function in response to the reward determined on each area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a value function.

FIG. 13 illustrates a sorting and selection of the similarities;

FIG. 15 illustrates a third example of the process of the agent;

DESCRIPTION OF EMBODIMENTS

Figure 1:
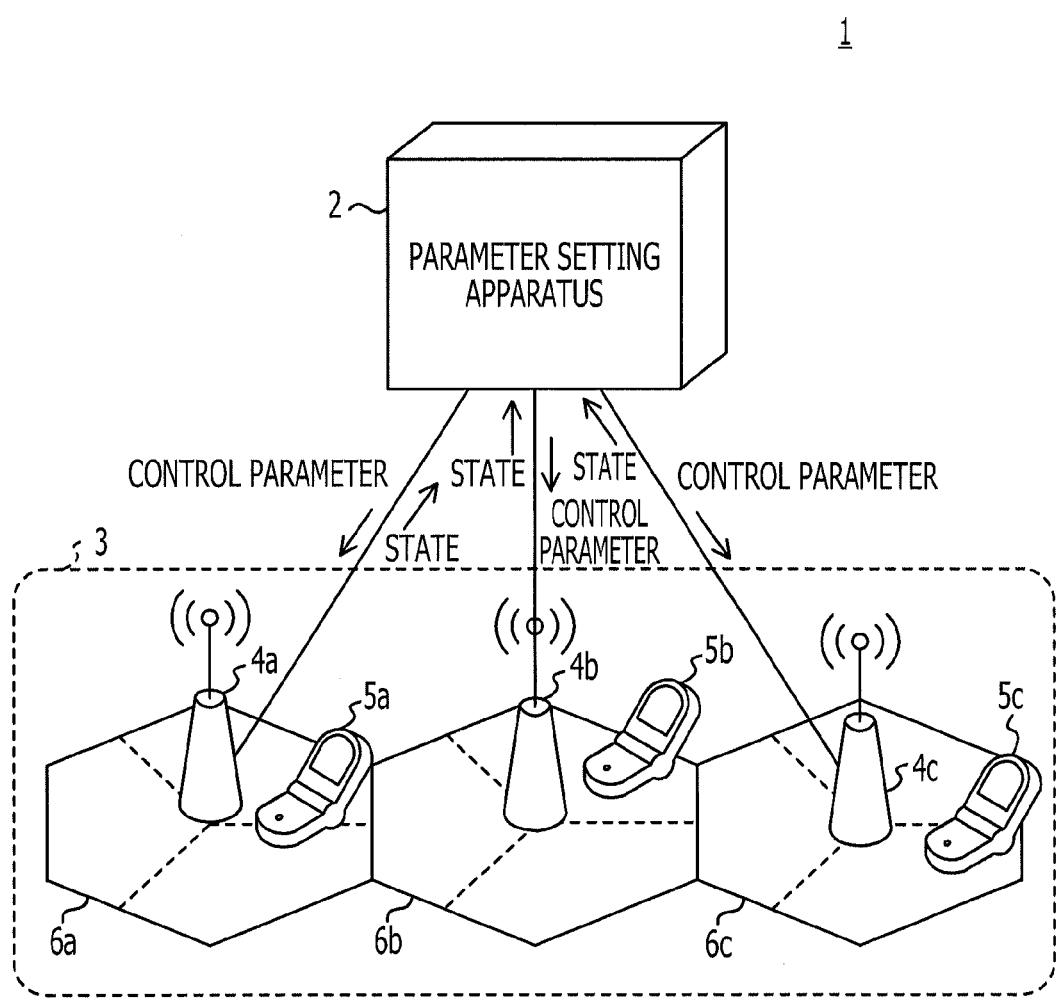
FIG. 1 generally illustrates a communication system.

Embodiments are described below with reference to the drawings. FIG. 1 generally illustrates a communication system 1. The communication system 1 includes a parameter setting apparatus 2 and a mobile communication network 3. The mobile communication network 3 includes base-station apparatuses 4a through 4c, and mobile-station apparatuses 5a through 5c. The base-station apparatuses 4a through 4c respectively cover cells 6a through 6c. In the discussion that follows, a base-station apparatus and a mobile-station apparatus are also referred to as a base station and a mobile station, respectively. The base-station apparatuses 4a through 4c, the mobile-station apparatuses 5a through 5c, and the cells 6a through 6c are collectively and respectively referred to as the "base station 4," the "mobile station 5", and the "cell 6," respectively.

The parameter setting apparatus 2 collects a state of the mobile communication network 3 from the base station 4 and the mobile station 5, and in response to the state of the mobile communication network 3, optimizes a control parameter that controls the base station 4 and the mobile station 5. To collect the state of the mobile communication network 3 and transmit the control parameter, the parameter setting apparatus 2 may be connected to the base station 4 via a wired network. The parameter setting apparatus 2 includes a plurality of SON applications as a control unit that automatically optimizes the control parameter in accordance with an assumed use case. The parameter setting apparatus 2 also includes a SON controller that selects an appropriate SON application in response to the state of the mobile communication network 3 and causes the selected SON application to operate.

Figure 2:
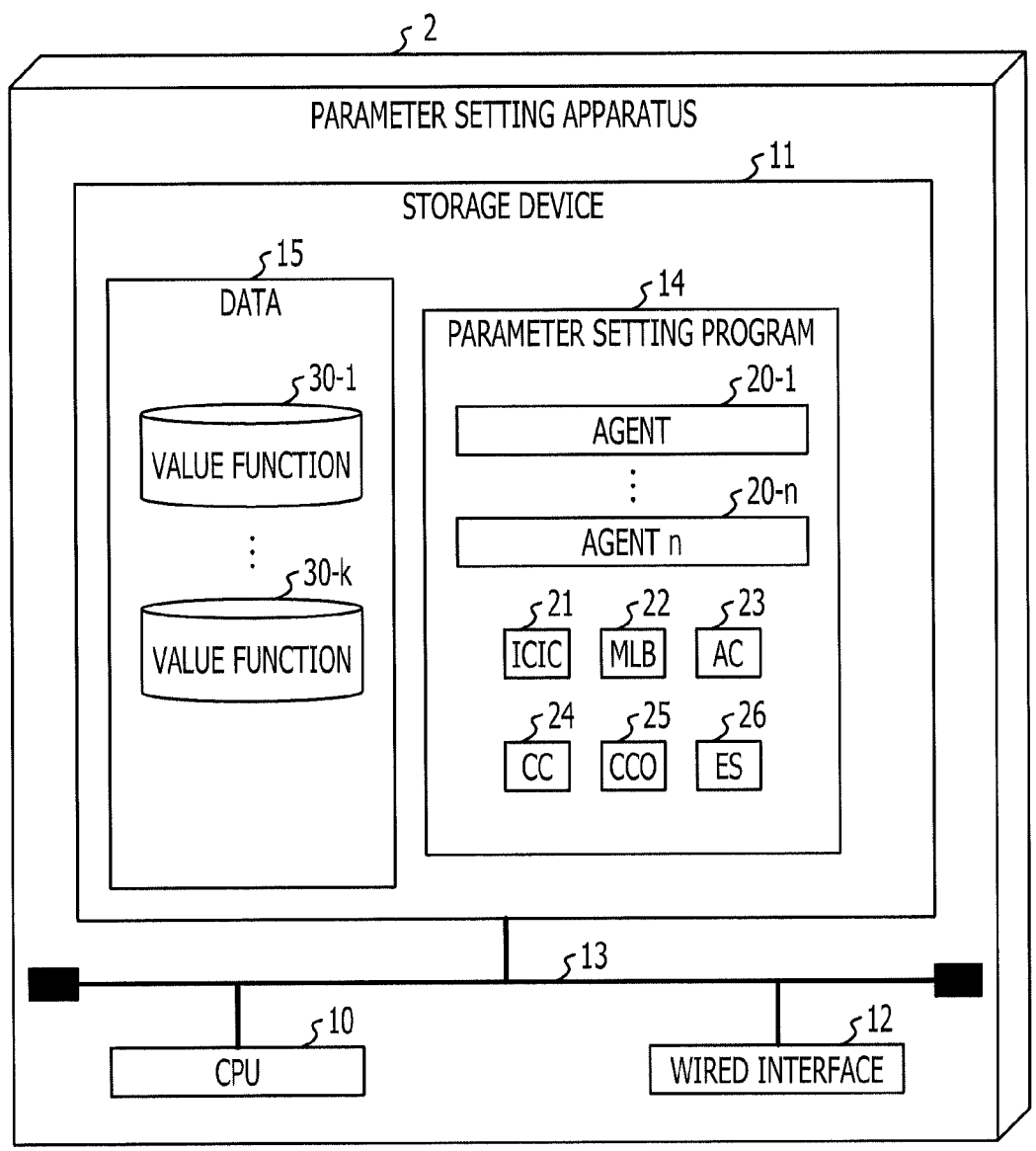
FIG. 2 illustrates a first example of a hardware configuration of a parameter setting apparatus.

A configuration of the parameter setting apparatus 2 is described below. FIG. 2 illustrates a first example of the hardware configuration of the parameter setting apparatus 2. The parameter setting apparatus 2 is a computer including central processing unit (CPU) 10, storage device 11, and wired interface 12. The hardware configuration of FIG. 2 is an example only that implements the parameter setting apparatus 2. Any other hardware configuration may also be adopted as long as the hardware configuration performs a process to be discussed below in the specification.

The storage device 11 stores a parameter setting program 14 and data 15. The storage device 11 may include, as storage elements, a random-access memory (RAM), a read-only memory (ROM), non-volatile memory, and hard disk. The CPU 10 performs a process to be discussed below to set the control parameter by executing the parameter setting program 14 stored on the storage device 11. The wired interface 12 performs a communication process with the base station 4. The CPU 10, the storage device 11, and the wired interface 12 are interconnected to each other via a bus 13.

The parameter setting apparatus 2 may include a removable medium reading unit (not illustrated) to read data stored on a computer readable portable recording medium. The removable medium reading unit may be an accessing device to each of a compact disk ROM (CD-ROM) drive, digital versatile disk ROM (DVD-ROM) drive, flexible disk drive, CD-R drive, DVD-R drive, magneto-optical (MO) drive, and flash memory. In one embodiment, the parameter setting program 14 may be distributed in a recorded form on a computer-readable portable medium, and may be installed from the computer-readable portable medium onto the storage device 11 via the removable medium reading unit.

In another embodiment, the parameter setting apparatus 2 may include a network interface that exchanges a program and a variety of data with a local area network (LAN), the Internet, or other network. The parameter setting program 14 may be installed onto the storage device 11 via the network interface.

The parameter setting program 14 includes a plurality of agent programs 20-1 through 20-n. In the following discussion and the attached drawings, the agent program is also simply referred to as the "agent" The agents 20-1 through 20-n are also collectively referred to as the "agent 20."

SON application programs 21-26, when executed by the CPU 10, causes the parameter setting apparatus 2 to operate as an SON application that automatically optimizes the control parameter. In the following discussion and the attached drawings, unless otherwise particularly noted, the "SON application program" is simply referred to as the "SON application."

The SON application 21 optimizes inter cell interference coordination (ICIC). The SON application 21 adjusts a collection period of interference information, and optimizes a wireless resource allocation between edge and center. The SON application 22 performs a mobility load balance (MLB) operation that optimizes a handover parameter at each cell.

The SON application 23 performs admission control (AC) optimization to optimizes a call admission threshold value. The SON application 24 performs congestion control (CC) optimization to optimize a determination threshold value of a congestion state that serves as a criterion of force disconnect call during connection.

The SON application 25 performs coverage and capacity optimization (CCO) to optimize setting of the tilt and azimuth of an antenna of the base station 4, and transmitting power of the base station 4. The SON application 26 performs energy saving (ES) to optimize the power on and power off control of a radiowave transmitter of the cell 6.

The processes of the SON applications 21 through 26 are examples of optimization processes to optimize the control parameters of the mobile communication network 3. The parameter setting apparatus 2 may include another SON application that performs another optimization process. For example, the parameter setting apparatus 2 may include an SON application that performs mobility robustness optimization (MRO), and link level retransmission scheme (LLR). The parameter setting apparatus 2 may further include an SON application that performs tracking areas optimization (TAO).

The agent 20 causes the parameter setting apparatus 2 to operate as an SON controller. The agent 20 is assigned at least one cell. Each agent 20 controls the SON applications 21-26 to be operative or inoperative in response to the state of the cell assigned thereto. To set the SON application to be operative, the agent 20 selects one of the SON applications 21-26 and causes the selected SON application to operate.

The agent 20 learns the necessity to start up the SON application in response to the state of the mobile communication network 3, and then learns whether to start up any SON application in response to the state of the mobile communication network 3. The learning is performed in the reinforcement learning. The storage device 11 stores as the data 15 value function 30-1 through value function 30-$k$ for use in the reinforcement learning. The value functions 30-1 through 30-$k$ are also collectively referred to as the "value function 30."

Figure 3:
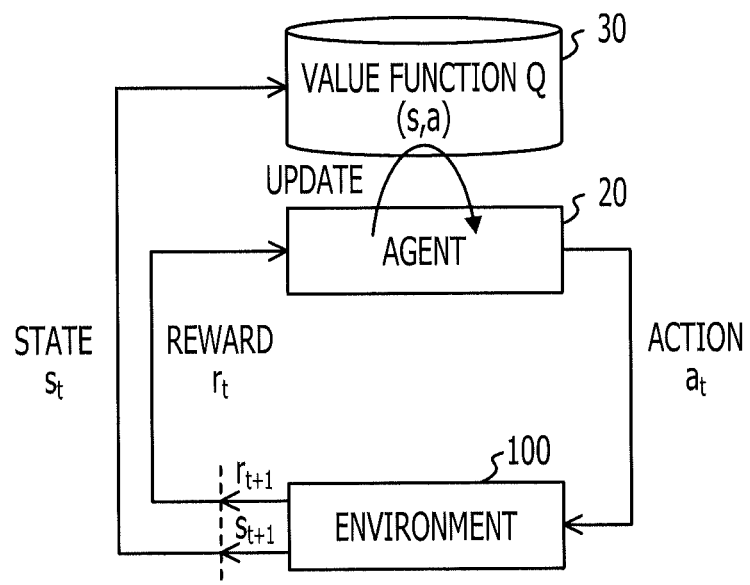
FIG. 3 illustrates a model of reinforcement learning.

FIG. 3 illustrates a model of the reinforcement learning. The reinforcement learning is a process of the agent 20 that interactively learns from the environment 100, and improves a policy to maximize a total amount of finally gained reward rt. An example of the reinforcement learning is Q-Learning. The agent 20 learns in procedures (1) and (2).

In procedure (1), the agent 20 selects an action at to be taken at time t in response to a state st of the environment 100.

In accordance with a value function Q(s,a), the agent 20 selects at a given probability with priority the action at that provides a maximum reward in state st. FIG. 4 illustrates an example of the value function Q(s,a). The value function Q(s,a) provides an action value if an action a is taken in state s. For example, if the values of individual state components 1, 2, and 3 of the state st are "1a," "2a," and "3a" with the value function Q(s,a) of FIG. 4, an action value to perform an action "ac2" is "0.5."

If the values of individual state components 1, 2, and 3 of the state st are "1a," "2a," and "3a," an action providing the highest action value is "ac1." If $\epsilon$ greedy policy is used, a probability of selecting the action ac1 providing the highest action value is determined in accordance with expression "1−$\epsilon$+$\epsilon$/1|A(s)|." A probability of selecting the action other than the action ac1, namely, action ac2 is determined in accordance with expression "$\epsilon$/1|A(s)|" Here, the value "$\epsilon$" is a set value within 0≤$\epsilon$≤1, and the value "|A(s)|" is the number of actions the agent 20 is permitted to select in state st. As illustrated in FIG. 4, the actions the agent 20 is permitted to select are two, i.e., ac1 and ac2.

In procedure (2), the environment transitions to st+1 in response to the action at of the agent 20, and the agent 20 is given a reward rt responsive to the transition. In response to the reward rt, the agent 20 updates the value function Q(s,a). The policy derived from the value function is thus improved. For example, the agent 20 may update the value function Q(s,a) in accordance with the following equation:

$$Q(s_t, a_t) \leftarrow Q(s_t, a_t) + \alpha \left[ r_t + \gamma \max_{a'} Q(s_{t+1}, a') - Q(s_t, a_t) \right]$$

where set values "$\alpha$," and "$\gamma$" represent a learning rate and a discount rate, respectively.

A function other than the value function in a table form of FIG. 4 may also be used as a value function. In another embodiment, a function that calculates a value in accordance with an expression including a state s, an action a, coefficients $\alpha 1, \alpha 2, \ldots$ may be used as the value function Q(s,a). In such a case, the agent 20 updates the coefficients $\alpha 1, \alpha 2, \ldots$ in response to the reward rt. In another embodiment, another policy may be used in place of the $\epsilon$ greedy policy. In yet another embodiment, softmax method may be used.

Figure 5:
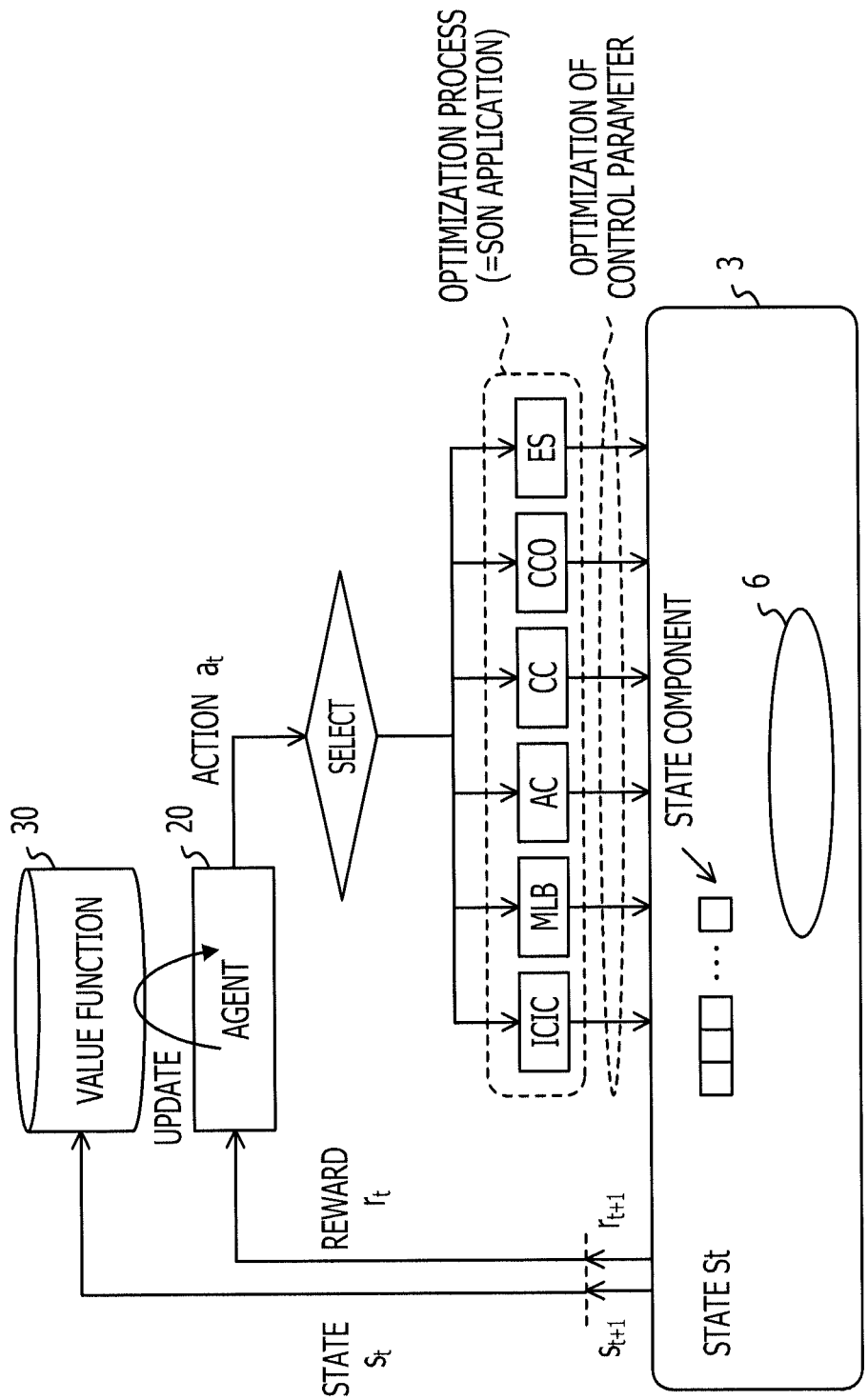
FIG. 5 illustrates a self-organizing network (SON) controller to which reinforcement learning is applied.

The reinforcement learning applicable to the learning of a startup process of the SON application by an SON controller is described below. FIG. 5 illustrates the reinforcement learning that is applied to the SON controller. When the reinforcement learning is applied to the SON controller, one state st, and one agent 20 are arranged in a system including at least one cell 6, and the agent 20 selects one of the SON applications as an action at.

The state st is a combination of discretized values of state components. For example, the state components may include cell-edge throughput, cell throughput, cell-edge packet transfer efficiency, cell mean packet transfer efficiency, cell-edge interference level, cell mean interference level, call success rate, lost-call rate, radio resource usage rate, mobile station distribution, energy saving mode, and adjacent cell load.

The reward rt is determined by weighting the following reward components and scalarizing the weighted reward components. For example, the reward components may include cell throughput, call success rate, lost-call rate, radio resource usage rate, and load unbalance rate. The call success rate, the lost-call rate, and the radio resource usage rate may be weighted with coefficients W1 through W3, respectively, as below and then the resulting reward rt is scalarized into scalar values.

Reward rt=$W1$×(call success rate)+$W2$×(1−lost-call rate)+$W3$×(1−radio usage rate).

An agent may have a low call success rate, a high lost-call rate, and a high radio usage rate, but mobile stations may generally uniformly distributed over the cell (in terms of mobile station distribution). In such a case, coverage and capacity optimization (CCO) rather than mobility load balance (MLB) is started so that learning is expected to distribute load and reduce load. CCO is expected to provide such a learning effect. MLB distributes load by modifying a connection cell of a mobile station through adjustment of the handover parameter, and is thus expected to be effective on a mobile station at a cell edge.

First Embodiment

Figure 6:
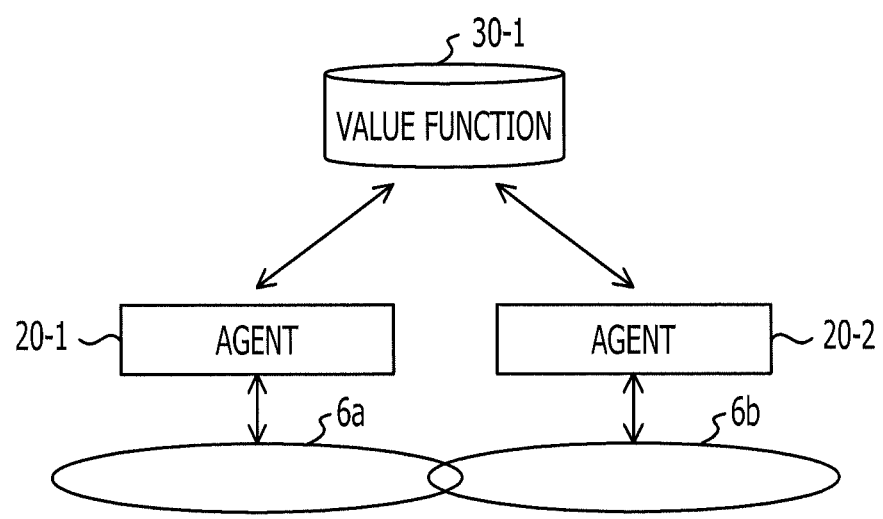
FIG. 6 illustrates a learning process of a first embodiment.

An operation of the communication system 1 is described below. FIG. 6 illustrates a learning process of a first embodiment. An agent 20-1 selects one of the SON applications 21-26 in response to a state of a cell 6a, and optimizes a control parameter of a mobile communication network 3 within the cell 6a. The agent 20-2 selects one of the SON applications 21-26 in response to a state of a cell 6b, and optimizes a control parameter in the mobile communication network 3 within the cell 6b. An area where the agent 20 optimizes the control parameter may be a single cell or a set including a plurality of cells.

The agent 20-1 determines a state in response to a state component measured at the cell 6a, then selects one of the SON applications 21-26 in response to the determined state, and causes the selected SON application to operate. The agent 20-2 determines a state in response to a state component measured at the cell 6b, then selects one of the SON applications 21-26 in response to the determined state, and causes the selected SON application to operate. The agents 20-1 and 20-2 select an operative state or an inoperative state of the SON applications 21-26 in accordance with a common value function 30-1, and then selects the SON application to be operative.

The agent 20-1 determines a reward in response to a reward component measured at the cell 6a, and performs reinforcement learning of the common value function 30-1 in response to the determined reward separately from the agent 20-2. On the other hand, the agent 20-2 determines a reward in response to a reward component measured at the cell 6b, and performs reinforcement learning of the common value function 30-1 in response to the determined reward separately from the agent 20-1. The plurality of agents, independently of each other, learn the common value function 30-1 in response to the rewards determined in the different areas, and share a learning effect therebetween.

Figure 7:
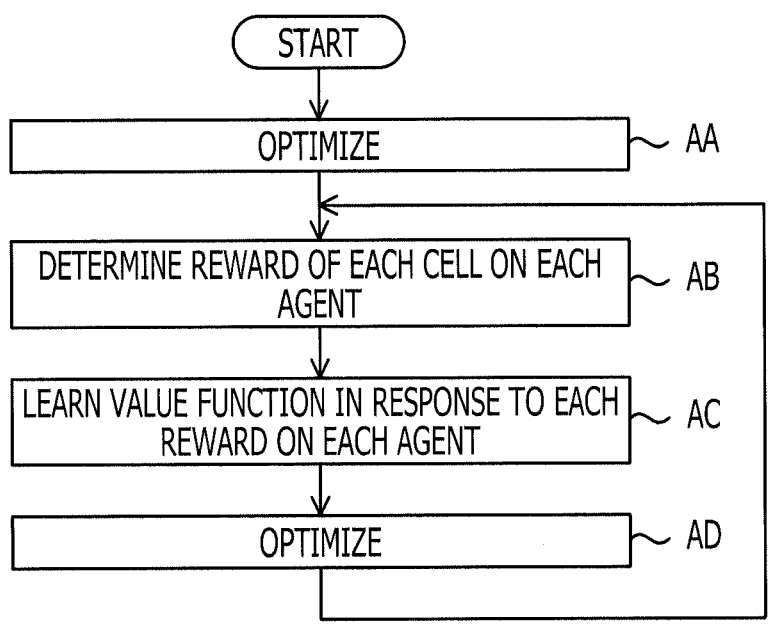
FIG. 7 illustrates a first example of a process of an agent.

FIG. 7 illustrates a first example of a process of the agent 20. In the following discussion, a series of steps discussed with reference to FIG. 6 may be understood as including a plurality of procedures. The word "operation" may be interchangeable with the word "step." The same is true of the processes of FIGS. 10, 12, and 15.

In step AA, in accordance with the value function 30-1 having an initial value set thereon, the agents 20-1 and 20-2 respectively selects SON applications from the SON applications 21-26 that are to be executed in response to states measured at the cells 6a and 6b respectively assigned to the agents 20-1 and 20-2. The agents 20-1 and 20-2 execute the selected applications, respectively, thereby optimizing the control parameters at the cells 6a and 6b. In step AB, the agents 20-1 and 20-2 determine rewards in response to reward components measured at the cells 6a and 6b respectively assigned thereto. In step AC, the agents 20-1 and 20-2 perform reinforcement learning of the common value function 30-1 in accordance with the determined rewards. In step AD, the agents 20-1 and 20-2 respectively select SON applications from the SON applications 21-26 to be performed in response to the states measured at the cells 6a and 6b in accordance with the value function 30-1 that accounts for the learning results. By performing the selected applications, the agents 20-1 and 20-2 optimize the control parameters at the cells 6a and 6b. Steps AB-AD are iterated.

According to the embodiment, the result of the learning process performed in response to the rewards determined in the different areas by the plurality of agents is shared among the agents. The learning effect gained during the same period of time is higher than when a single agent learns a unique value function. The learning efficiency is thus increased.

Second Embodiment

Figure 8:
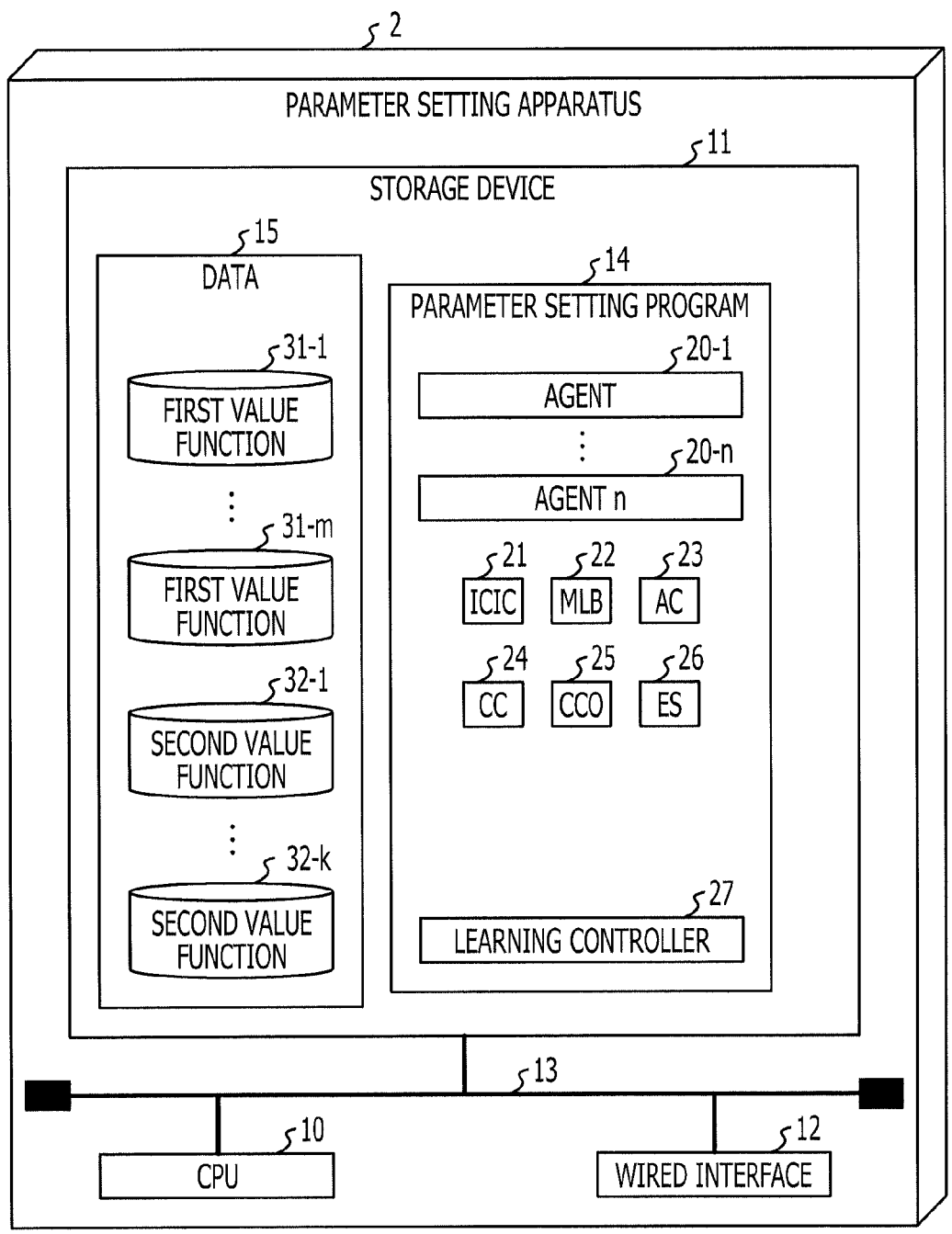
FIG. 8 illustrates a second example of the hardware configuration of the parameter setting apparatus.

A second embodiment is described below. According to the second embodiment, a plurality of agents that optimize control parameters of a plurality of cells similar in characteristics learn a common value function. FIG. 8 illustrates a second example of the hardware configuration of the parameter setting apparatus. Elements identical to those illustrated in FIG. 2 are designated with the same reference numerals and the discussion thereof is omitted herein.

The storage device 11 stores as the data 15 first-value functions 31-1 through 31-m, and second-value functions 32-1 through 32-k, each function for use in reinforcement learning. In the following discussion, the first-value functions 31-1 through 31-m are collectively referred to as the "first-value function 31," and the second-value functions 32-1 through 32-k are collectively referred to as the "second-value function 32."

The parameter setting program 14 includes a learning control program 27 that controls the agent 20 that learns the value function. In the following discussion and attached drawings, the learning control program may also referred to as the "learning controller."

Figure 9A:
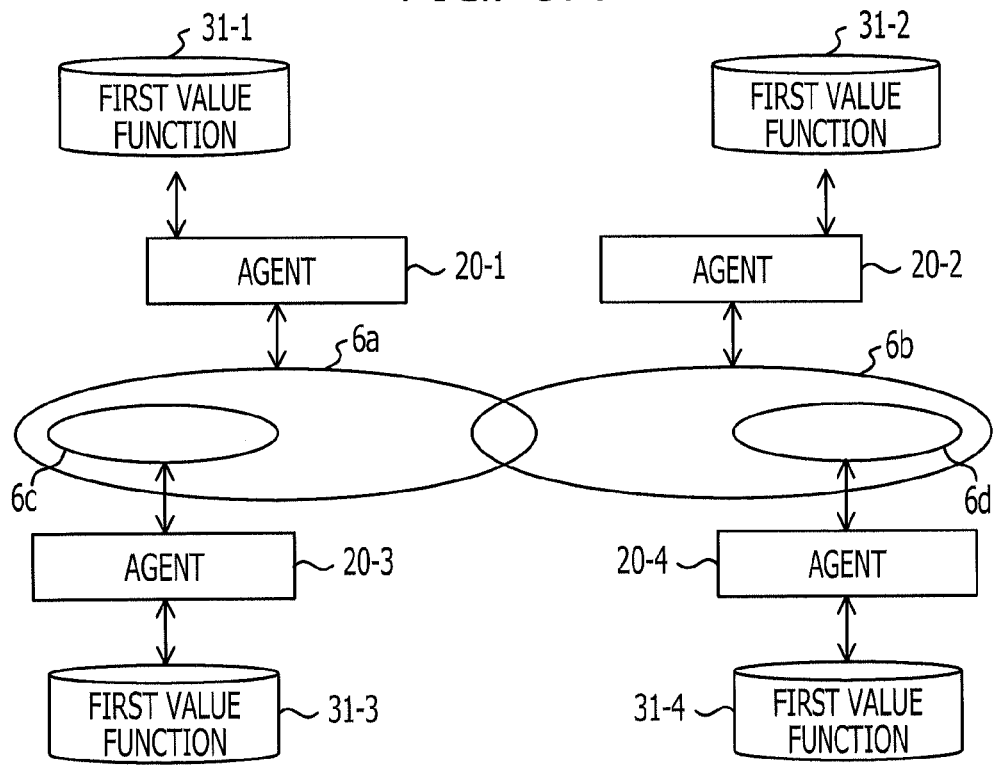
FIGS. 9A and 9B illustrate a learning process of a second embodiment.
Figure 9B:
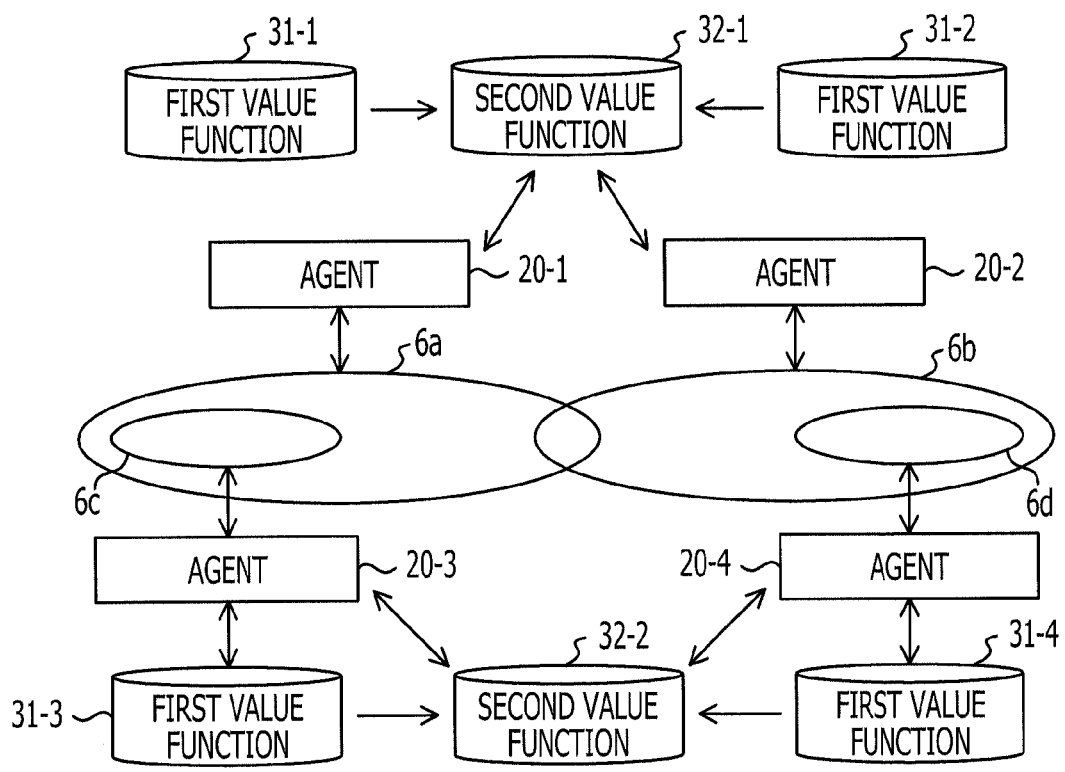

FIGS. 9A and 9B illustrate a learning process of the second embodiment. In the second through fifth embodiments described below, the learning process is divided into a first stage and a second stage. FIGS. 9A and 9B respectively illustrate the first stage and the second stage of the learning process.

At the first stage, agents 20-1 through 20-4 determine rewards at cells 6a through 6d, and perform reinforcement learning of individual first-value functions 31-1 through 31-4 in accordance with the determined rewards. In accordance with the first-value functions 31-1 through 31-4 that account for the learning results, the agents 20-1 through 20-4 respectively select the SON applications from the SON applications 21-26 that are performed in response to the states measured at the cells 6a through 6d. By performing the respectively selected applications, the agents 20-1 through 20-4 optimize the control parameters at the cells 6a through 6d. The learning of the first-value functions 31-1 through 31-4 and the optimization of the control parameters are iterated for a specific period of time.

The learning controller 27 then determines a similarity between the first-value functions 31. The learning controller 27 determines a second-value function 32 by combining the first-value functions 31 having a high similarity therebetween. As illustrated in FIG. 9B, the first-value function 31-1 and the first-value function 31-2 are combined into a second-value function 32-1, and the first-value function 31-3 and the first-value function 31-4 are combined into a second-value function 32-2.

At the second stage, each agent 20 performs reinforcement learning of the second-value function 32 into which the first-value functions 31 learned at the first stage are combined. In accordance with the second-value function 32 into which the first-value functions 31 learned at the first stage are combined, the agent 20 selects one of the SON applications 21-26 that is to be performed at the cell 6 to optimize the control parameter.

As illustrated in FIG. 9B, the agent 20-1 and the agent 20-2 respectively determine the rewards at the cells 6a and 6b independently of each other, and then perform reinforcement learning of the common second-value function 32-1 in response to the determined rewards independently of each other. The agent 20-3 and the agent 20-4 respectively determine the rewards at the cells 6c and 6d independently of each other, and then perform reinforcement learning of the common second-value function 32-2 in response to the determined rewards independently of each other.

In accordance with the common second-value function 32-1 that accounts for the learning results, the agents 20-1 and 20-2 select the respective applications thereof from the SON applications 21-26 that are preformed in response to the states measured at the cells 6a and 6b. In accordance with the common second-value function 32-2 that accounts for the learning results, the agents 20-3 and 20-4 select the respective applications thereof from the SON applications 21-26 that are preformed in response to the states measured at the cells 6c and 6d.

Figure 10:
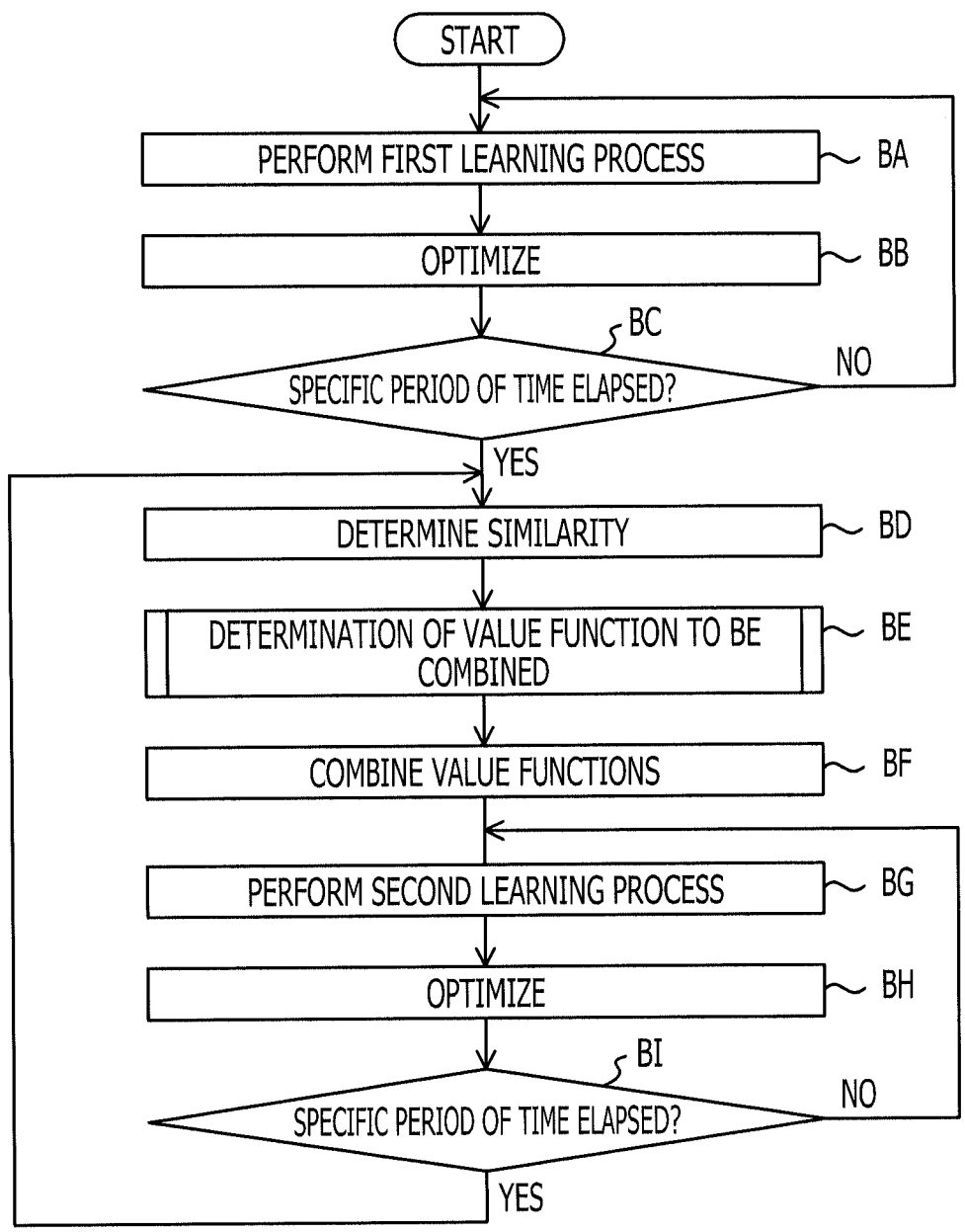
FIG. 10 illustrates a second example of the process of the agent.

The process of the agent 20 is described below with reference to FIG. 10. An iterative loop through steps BA through BC corresponds to the first stage, and an iterative loop through steps BG through BI correspond to the second state.

In step BA, each agent 20 performs a first learning process. In the first learning process, each agent 20 determines a reward at a cell 6 assigned thereto, and performs reinforcement learning of the first-value function 31 thereof in response to the determined reward.

In step BB, in accordance with the first-value function 31 that accounts for the learning results, each agent 20 selects from the SON applications 21-26 an SON application that is to be performed in response to the state measured at the cell. The agent 20 optimizes the control parameter at the cell by performing the selected SON application.

In step BC, the learning controller 27 determines whether the iterative loop of steps BA through BC has been iterated for a specific period of time. If the iterative loop of steps BA through BC has been iterated for the specific period of time (Yes from step BC), the learning controller 27 proceeds to step BD. If the iterative loop of steps BA through BC has not yet been iterated for the specific period of time (No from step BC), the learning controller 27 returns to step BA.

In step BD, the learning controller 27 determines a similarity between the first-value functions 31. In step BE, the learning controller 27 determines a combination of first-value functions 31 that are to be combined in accordance with the similarity. In step BF, the learning controller 27 combines the first-value functions 31.

In step BG, the agent 20 performs a second learning process. In the second learning process, the agent 20 determines a reward at the cell 6 assigned thereto. In accordance with the determined rewards, the agents 20 independently of each other perform reinforcement learning of the second-value function 32 into which the first-value functions 31 learned in the first learning process (step BA) are combined.

In step BH, in accordance with the second-value function 32 into which the first-value functions 31 learned at the first stage are combined, the agent 20 selects from the SON applications 21-26 an SON application that optimizes the control parameter at the cell 6 assigned thereto, and performs the selected SON application.

In step BI, the learning controller 27 determines whether an iterative loop of step BG through step BI has been iterated for a specific period of time. If the iterative loop of steps BG through BI has been iterated for the specific period of time (Yes from step BI), the learning controller 27 returns to step BD. If the iterative loop of steps BG through BI has not been iterated for the specific period of time (No from step BI), the learning controller 27 returns to step BG.

Figure 11:
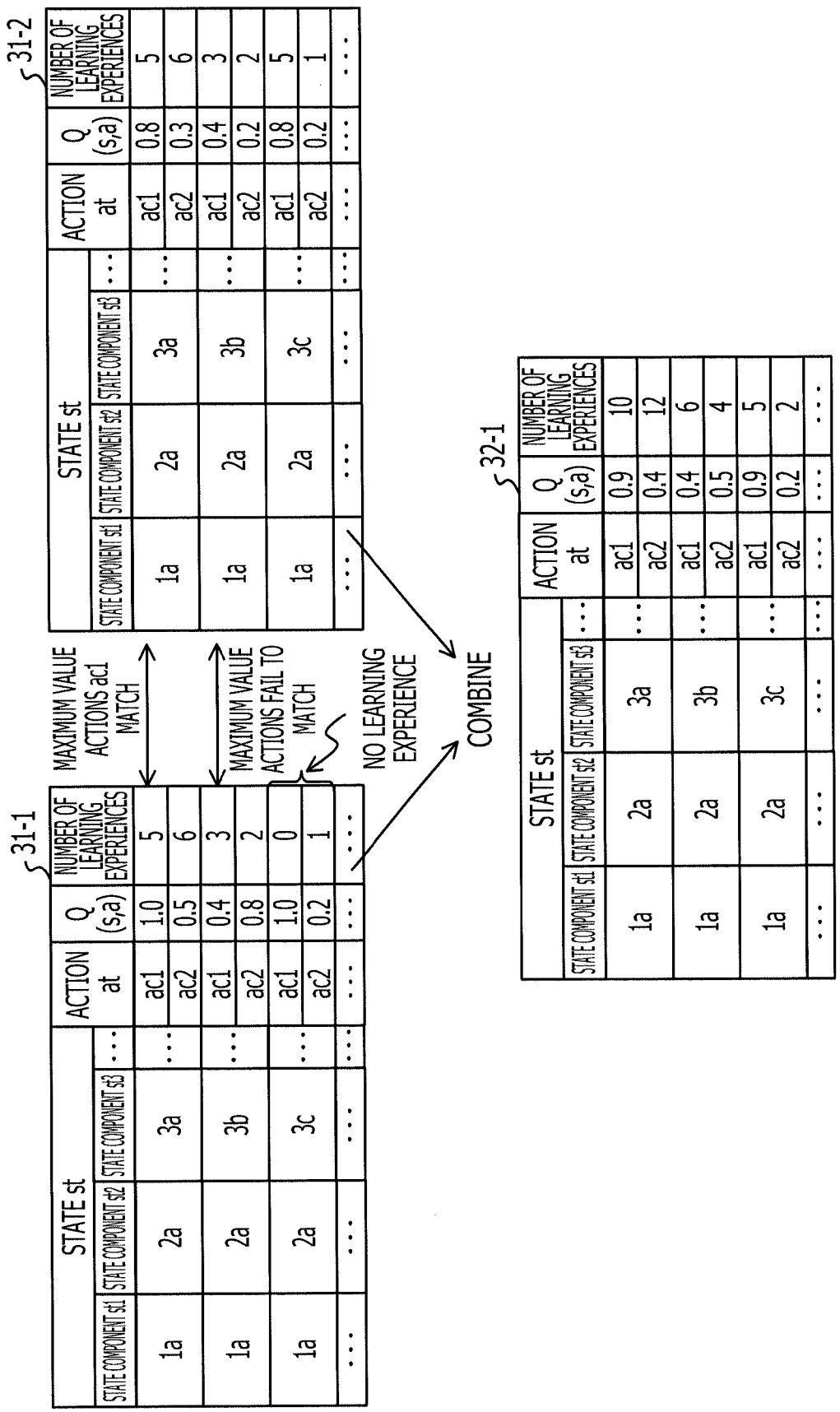
FIG. 11 illustrates a similarity of value functions.

Described below are the determination operation of the similarity in step BE and the combination operation of the value functions in step BF. FIG. 11 illustrates the similarity of value functions. The first-value function 31 and the second-value function 32 illustrated in FIG. 11 include another information item "number of experiences" in addition to the information items described with reference to FIG. 4. The "number of learning experiences" refers to the number of times by which the agent 20 has performed an SON application corresponding to action at in state st. More specifically, the "number of learning experiences" refers to the number of updates of the action value Q(s,a) corresponding to state st and action at. For example, action ac1 is selected by five times with state components st1, st2, and st3 at 1a, 2a, and 3a, respectively, in the first-value function 31-1.

In the determination of the similarity of the first-value functions 31, the learning controller 27 determines at each state st whether actions at having the highest action value Q(s,a) match between the first-value functions 31, and determines a similarity between the first-value functions 31 in accordance with the degree of match of the actions at having the highest action value Q(s,a). As illustrated in FIG. 11, for example, the action at having the highest action value Q(s,a) in the state with the state components st1, st2, and st3 respectively at "1a," "2a," and "3a," is "ac1" in each of the first-value function 31-1 and the first-value function 31-2. In this state, the action at having the highest action value Q(s,a) in the first-value function 31-1 matches the action at having the highest action value Q(s,a) in the first-value function 31-2.

On the other hand, the action at having the highest action value Q(s,a) in the state with the state components st1, st2, and st3 respectively at "1a," "2a," and "3b," is "act" in the first-value function 31-1 and "ac1" in the first-value function 31-2. In this state, the action at having the highest action value Q(s,a) in the first-value function 31-1 fails to match the action at having the highest action value Q(s,a) in the first-value function 31-2. The learning controller 27 defines as a similarity a ratio of the number of states in which the actions at having the highest action value Q(s,a) match each other to the number of values taken by the state st of the first-value function 31.

According to the embodiment, the learning controller 27 compares the actions at having the highest action value Q(s,a) with respect to the states having the action values thereof learned. For example, the action ac1 is not selected at all in the state with the state components st1, st2, and st3 respectively at "1a," "2a," and "3c" in the first-value function 31-1. A value "1.0" of the action value Q(s,a) corresponding to the action ac1 is a programmed default value, and is not a learned value. The action value of the state with the state components st1, st2, and st3 respectively at "1a," "2a," and "3c" in the first-value function 31-1 is not yet learned.

The learning controller 27 determines the number of states at which the actions at having the highest action value Q(s,a) match each other, out of the states having the learned action values, and determines as a similarity the ratio of the number of states at which the actions having the highest action value Q(s,a) match each other to the number of states having the learned action values. In another embodiment, the learning controller 27 may compare the actions at having the highest action value Q(s,a) concerning only the states having the number of learning experiences equal to or higher than a specific number of times.

When the first-value functions 31 are combined into the second-value function 32, the learning controller 27 uses the state st and the action at that the first-value function 31 may take, as the state st and the action at that the second-value function 32 may take. The learning controller 27 averages the values of the action values Q(s,a) of the first-value functions 31 to be combined with respect to the state st and the action at to determine the action value Q(s,a) of the second-value function 32 at the state st and the action at. In yet another embodiment, in place of the average value, the learning controller 27 defines as the action value Q(s,a) of the second-value function 32 a minimum value or a maximum value of the action values Q(s,a) of the first-value functions 31 to be combined.

Figure 12:
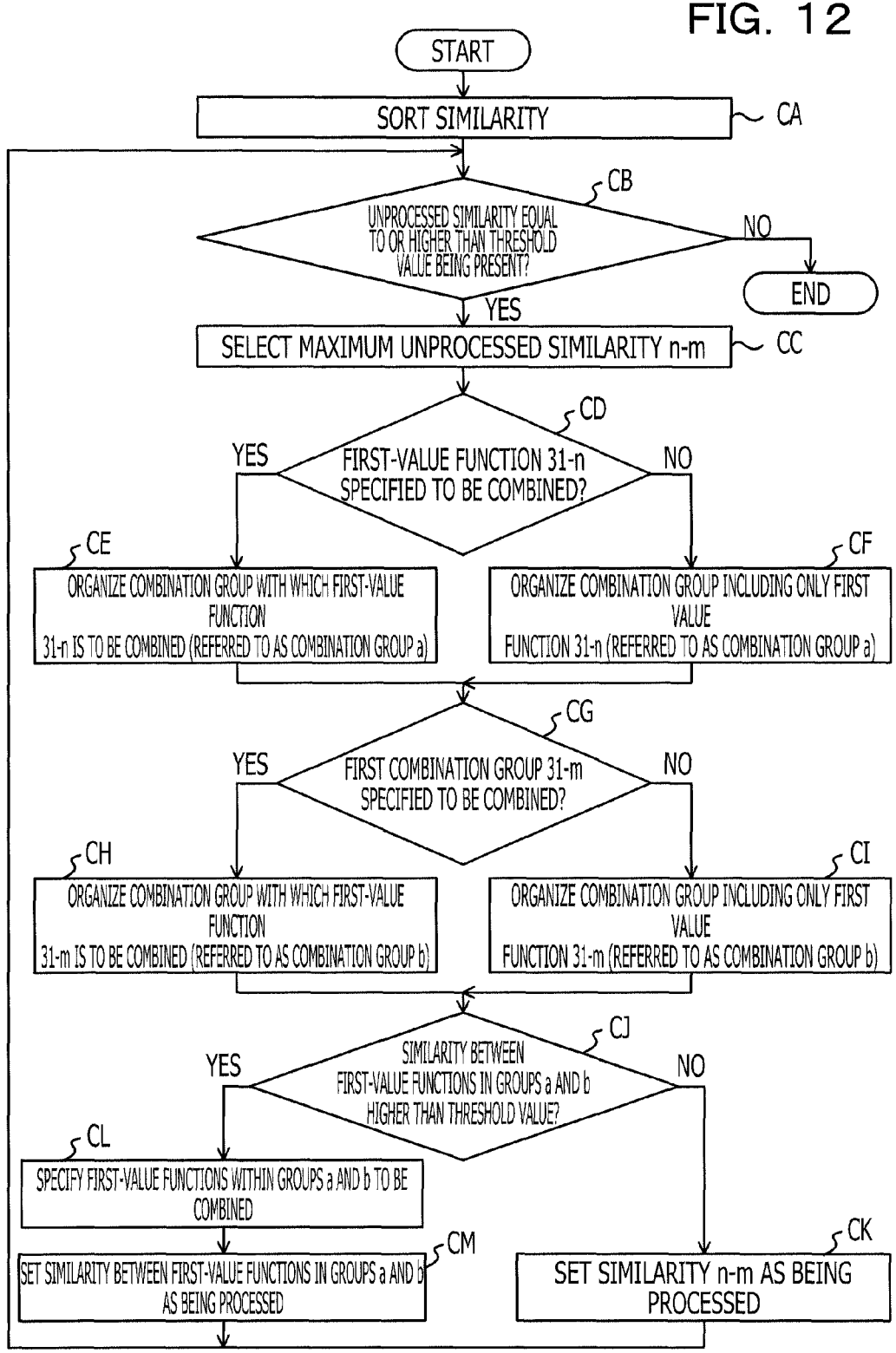
FIG. 12 illustrates a specifying process of value functions to be combined.

The specifying operation of the combination of the value functions to be combined is described below. FIG. 12 illustrates the specifying operation of the value functions to be combined. In the following discussion, "n-m" represents a similarity between a first-value function 31-$n$ and a first-value function 31-$m$ (n and m are integers, each being equal to or larger than 1).

In step CA, the learning controller 27 sorts the similarities of every combination of first-value functions 31 in the order from a high similarity to a low similarity. FIG. 13 illustrates the sorted similarities. As illustrated in FIG. 13, the similarities are determined between the first-value functions 31-1 through 31-5. The similarities are high to low in the order of 1-2, 2-3, 4-5, 1-4, 2-4, 1-5, 2-5, ..., 1-3. The similarities 1-2,

2-3, 4-5, 1-4, 2-4, 1-5, and 2-5 are higher than a specific threshold value, and the similarity 1-3 is lower than the specific threshold value.

In step CB, the learning controller 27 determines whether there is any similarity, equal to or higher than the threshold value, which has not undergone steps CC through CM yet. Since the similarities 1-2, 2-3, 4-5, 1-4, 2-4, 1-5, 2-5, . . . are higher than the specific threshold value, and are unprocessed (Yes from step CB) in the determination operation in step CB at a first cycle, processing proceeds to step CC. Steps CB through CM are iterated while there still remains an unprocessed similarity higher than the threshold value. If there is no unprocessed similarity higher than the threshold value (No from step CB), processing ends.

In step CC, the learning controller 27 selects a maximum unprocessed similarity n-m from among the unprocessed similarities. In this example, the similarity 1-2 is selected. In step CD, the learning controller 27 determines whether steps CC through CM performed heretofore have specified that the first-value function 31-$n$ is to be combined with another first-value function 31 other than the first-value function 31-$m$. If steps CC through CM performed heretofore have specified that the first-value function 31-$n$ is to be combined with another first-value function 31 other than the first-value function 31-$m$ (Yes from step CD), processing proceeds to step CE. If steps CC through CM performed heretofore have specified that the first-value function 31-$n$ is to be combined with none of the first-value functions 31 (No from step CD), processing proceeds to step CF.

In step CE, the learning controller 27 organizes a group of first-value functions 31 including the first-value function 31-$n$ and the first-value functions 31 that is specified to be combined with the first-value function 31-$n$. This group is hereinafter referred to as a combination group a. Processing proceeds to step CG. In step CF, the learning controller 27 organizes a combination group including only the first-value functions 31-$n$. Processing proceeds to step CG. At this point of time, the first-value function 31-1 is not yet specified to be combined with any of the first-value functions 31 (No from step CD), the learning controller 27 organizes a combination group a including only the first-value function 31-1.

In step CG, the learning controller 27 determines whether steps CC through CM performed heretofore have specified that the first-value function 31-$m$ is to be combined with another first-value function 31 other than the first-value function 31-$n$. If it is specified that the first-value function 31-$m$ is to be combined with another first-value function 31 other than the first-value function 31-$n$ (Yes from step CG), processing proceeds to step CH. If it is specified that the first-value function 31-$m$ is to be combined with none of the first-value functions 31 (No from step CG), processing proceeds to step CI.

In step CH, the learning controller 27 organizes a group of first-value functions 31 including the first-value function 31-$m$ and the first-value functions 31 that is specified to be combined with the first-value function 31-$m$. This group is hereinafter referred to as a combination group b. Processing proceeds to step CJ. In step CI, the learning controller 27 organizes a combination group including only the first-value function 31-$m$. Processing proceeds to step CJ. At this point of time, the first-value function 31-2 is not yet specified to be combined with any of the first-value functions 31 (No from step CG), the learning controller 27 organizes a combination group b including only the first-value function 31-2.

In step CJ, the learning controller 27 determines whether each of all combinations of first-value functions 31 included in the groups a and b has a similarity higher than the threshold value. If the similarity is higher than the threshold value (Yes from step CJ), processing proceeds to step CL. If the similarity is not higher than the threshold value (No from step CJ), processing proceeds to step CK. In step CK, the learning controller 27 does not specify the first-value function 31-$n$ and the first-value function 31-$m$ to be combined and sets a similarity n-m as a processed similarity. Processing returns to step CB.

At this point of time, the combinations of first-value functions 31 included in the combination groups a and b are only a combination of the first-value function 31-1 and the first-value function 31-2, and the similarity 1-2 is above the threshold value (Yes from step CJ). Processing proceeds to step CL.

In step CL, the learning controller 27 specifies the first-value functions 31 included the combination groups a and b to be combined. In step CM, the learning controller 27 sets all similarities of the combinations of first-value functions 31 included in the combination groups a and b as being processed similarities. In this process example, the learning controller 27 specifies the first-value function 31-1 and the first-value function 31-2 to be combined and sets the similarity 1-2 as being processed. Processing returns to step CB.

In the next loop, the next highest similarity 2-3 is selected in step CC. Since the first-value function 31-2 is specified as the first-value function 31-$n$ to be combined with the first-value function 31-1, the learning controller 27 performs the operation in the step CE depending on the determination operation in step CD. In step CE, the learning controller 27 organizes a combination group a including the first-value function 31-1 and the first-value function 31-2.

On the other hand, the learning controller 27 does not specify that the first-value function 31-3 as the first-value function 31-$m$ is to be combined with any of the first-value functions 31. The learning controller 27 performs the operation in the step CI depending on the determination operation in step CG. In step CI, the learning controller 27 organizes a combination group including only the first-value function 31-3.

In step CJ, the learning controller 27 determines whether each of all combinations of first-value functions 31 included in the groups a and b has a similarity higher than the threshold value. At this point of time, the combinations of first-value functions are those of the first-value function 31-1 through the first-value function 31-3, and the similarity 1-3 is lower than the threshold value (No from step CJ), processing proceeds to step CK. In step CK, the learning controller 27 does not specify that the first-value function 31-2 and the first-value function 31-3 are to be combined but sets the similarity 2-3 to be processed. Processing returns to step CB.

In the next loop, the third highest similarity 4-5 is selected in step CC. At this point of time, it is not specified yet that the first-value function 31-4 as the first-value function 31-$n$ is to be combined with any first-value function 31 and that the first-value function 31-5 as the first-value function 31-$m$ is to be combined with any first-value function 31. As with the first-value function 31-1 and the first-value function 31-2, the learning controller 27 specifies in steps CD, CF, CG, CI, and CJ through CM that each of the first-value function 31-4 and the first-value function 31-5 is to be combined. Processing returns to step CB.

In the next loop, the fourth highest similarity 1-4 is selected in step CC. Since it is specified that the first-value function 31-1 as the first-value function 31-$n$ is to be combined with the first-value function 31-2, the learning controller 27 performs the operation in step CE in accordance with the determination operation in step CD. In step CE, the learning controller 27 organizes a combination group a including the first-value function 31-1 and the first-value function 31-2.

Since it is specified that the first-value function 31-4 as the first-value function 31-m is to be combined with the first-value function 31-5, the learning controller 27 performs the operation in step CH in response to the determination operation in step CG. In step CH, the learning controller 27 organizes a combination group b including the first-value function 31-4 and the first-value function 31-5.

In step CJ, the learning controller 27 determines whether each of the similarities of all the combinations of first-value functions 31 included in the combination groups a and b is higher than the threshold value. At this point of time, the combinations of first-value functions 31 are those of the first-value functions 31-1, 31-2, 31-4, and 31-5. Since all the similarities 1-2, 1-4, 1-5, 2-4, 2-5, and 4-5 are all higher than the threshold value (Yes from step CJ), processing proceeds to step CL.

In step CL, the learning controller 27 specifies that the first-value functions 31-1, 31-2, 31-4, and 31-5 included in the combination groups a and b are to be combined. In step CM, the learning controller 27 sets the similarities of all the combinations of first-value functions 31 included in the combination groups a and b to be processed similarities. The similarities 2-4, 1-5, and 2-5 newly become processed similarities. Processing returns to step CB. Steps CB through CM are iterated until no unprocessed similarity higher than the threshold value is present.

The combination specifying operation is performed on the first-value functions 31 in each combination in the order of from a combination having a high similarity to a combination having a low similarity. If it is specified that one first-value function 31 of the pair is to be combined with a third first-value function 31 other than the other first-value function 31 of the pair, the combination specifying operation is performed in accordance with a similarity between the other first-value function 31 and the third first-value function 31. When three or more first-value functions 31 are combined into a single second-value function 32, the first-value functions 31 having higher similarities are combined with a higher priority while the combination of first-value functions 31 having a similarity lower than the threshold value is prevented.

According to the embodiment, a plurality of agents that optimize control parameters of a plurality of cells similar in characteristics perform reinforcement learning of a common value function. The learning effect of the plurality of cells is accounted for in the common value function, and the learning speed is increased. The value function responsive to the characteristics of the cell is also learned.

Third Embodiment

A third embodiment is described below. According to the third embodiment, the common second-value function 32 is determined by combining the first-value functions 31 in the same manner as in the second embodiment, and then it is determined whether the similarity between the first-value functions 31 becomes smaller than a threshold value. If the similarity between the first-value functions 31 becomes smaller than the threshold value, the learning of the second-value function 32 and the selection of the SON application in accordance with the second-value function 32 are suspended while the learning of the first-value function 31 and the selection of the SON application in accordance with the first-value function 31 resume. In the following discussion, the phrase "decomposes the second-value function 32" refers to the operation in which the learning of the second-value function 32 and the selection of the SON application in accordance with the second-value function 32 are suspended while the learning of the first-value function 31 and the selection of the SON application in accordance with the first-value function 31 resume.

Figure 14A:
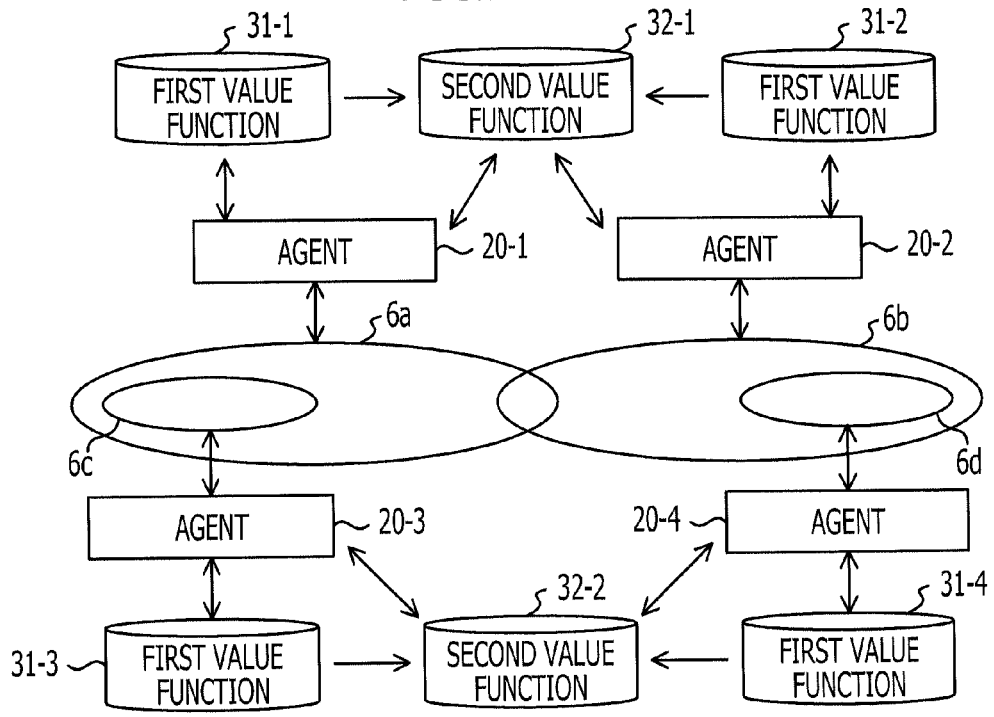
FIGS. 14A and 14B illustrate a learning process of a third embodiment.
Figure 14B:
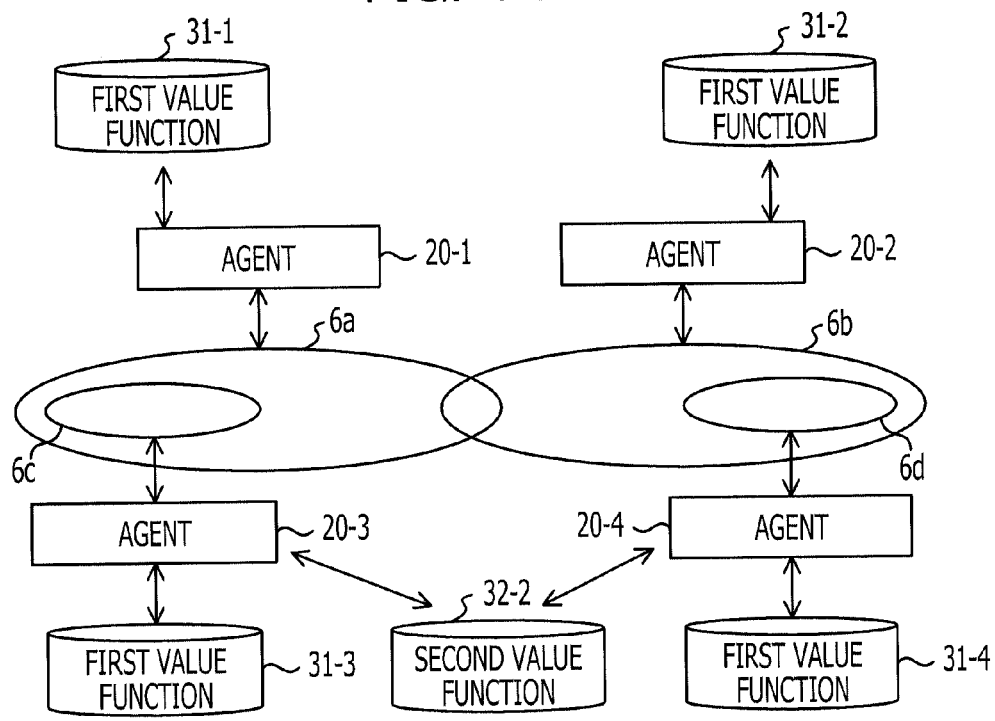

FIGS. 14A and 14B illustrate the learning process of the third embodiment. FIG. 14A illustrates the relationship of the cells 6a through 6d, agents 20-1 through 20-4, first-value functions 31-1 through 31-4, and second-value functions 32-1 and 32-2. The relationship of FIG. 14A is identical to the relationship discussed with reference to the second embodiment.

The agents 20-1 and 20-2 learn the second-value function 32-1 while also respectively learning the first-value functions 31-1 and 31-2 in parallel. The agents 20-3 and 20-4 learn the second-value function 32-2 while also respectively learning the first-value functions 31-3 and 31-4 in parallel.

It is now assumed that the similarity between the first-value functions 31-1 and 31-2 combined into the second-value function 32-1 becomes lower than the threshold value later. In such a case, the learning controller 27 decomposes the second-value function 32-1. Such a state is illustrated in FIG. 14B.

The process of the agent 20 is described with reference to FIG. 15. Steps DA through DD are respectively identical to steps BA through BD discussed with reference to FIG. 10. In step DE, the learning controller 27 determines a second-value function 32 to be decomposed. If the similarity in any of the pairs of first-value functions 31 combined into the second-value function 32 is not above the threshold value, the learning controller 27 determines that the second-value function 32 is to be decomposed. As described below, in step DI, the agent 20 learns the second-value function 32 while learning the first-value function 31 learned in the first stage (steps DA through DC).

In step DF, the learning controller 27 decomposes the second-value function 32 determined in step DE. Steps DG, DH, DJ and DK are respectively identical to steps BE, BF, BH, and BI described with reference to FIG. 10. In step DI, the agent 20 performs the second learning process. Each agent 20 determines a reward at the cell 6 assigned thereto. In response to the determined reward, each agent 20, independently of the other agents 20, performs reinforcement learning of the first-value function 31 learned in the first learning process (step DA) and of the second-value function 32 resulting from combining the first-value functions 31.

According to the embodiment, the second-value function 32 is decomposed if the similarity between the first-value functions 31 combined into the second-value function 32 becomes lower. This arrangement prevents a decrease in the learning efficiency caused by an influence that the learning effect of the cells having a low similarity gives on the same value functions.

Fourth Embodiment

A fourth embodiment is described below. According to the fourth embodiment, cells predicted to be similar in characteristics are sorted as a cell group, and the cell group includes a plurality of cells. In a first stage of a learning process, the agent 20 having a cell assigned thereto learns a common first-value function 31 on a per cell group basis.

Figure 16A:
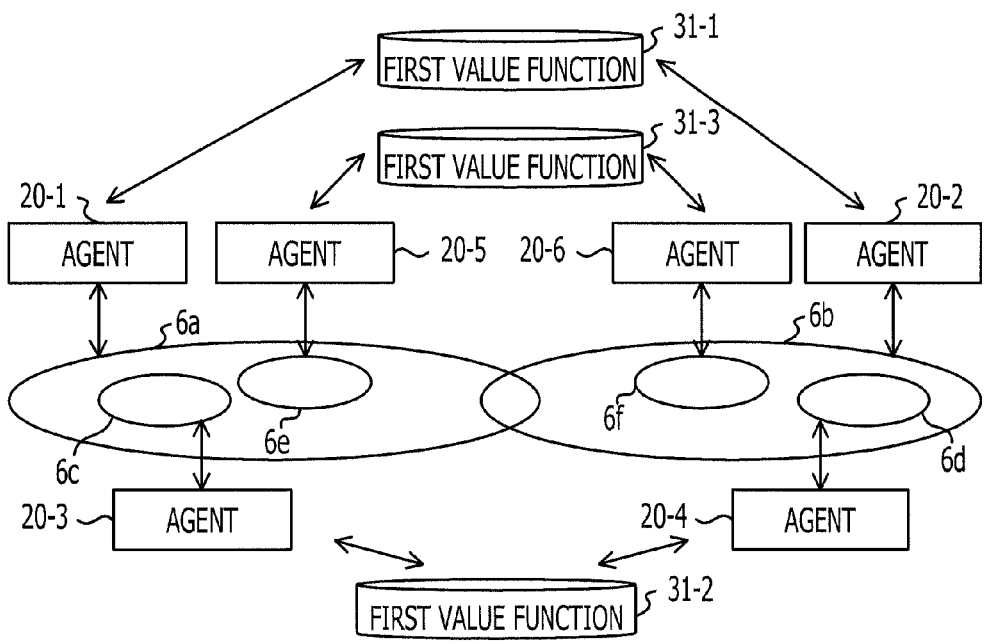
FIGS. 16A and 16B illustrate a learning process of a fourth embodiment.
Figure 16B:
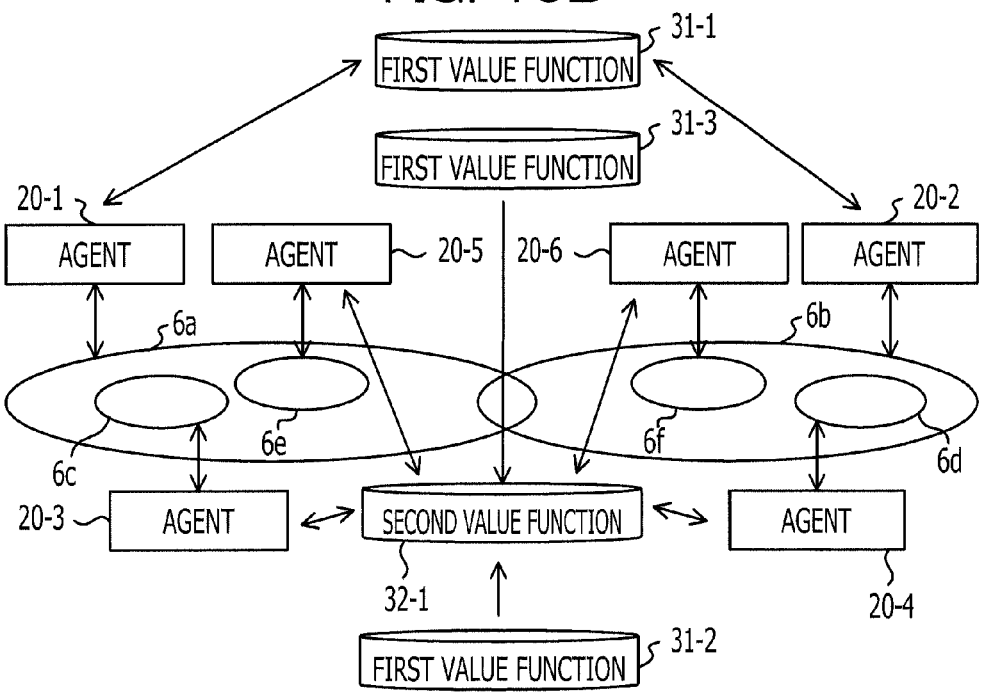

FIGS. 16A and 16B illustrate the learning process of the fourth embodiment. In the fourth embodiment, cells 6a and 6b form one cell group, cells 6c and 6d form one cell group, and cells 6e and 6f form one cell group. The cells 6a and 6b are macrocells, the cells 6c and 6d are femtocells, and the cells 6e and 6f are picocells.

The macrocell, the picocell, and the femtocell have transmission power in that order from high to low power with the macrocell having the highest transmission power. The cells may be grouped according to the difference in transmission power. The picocell may be installed indoors. The picocell may also be installed outdoors, such as in a shadow of a building. A plurality of different picocell groups may be arranged depending on whether the picocell is installed indoors or outdoors. More specifically, the cells may be grouped depending on a difference in the installation situation of a base station.

The agents 20-1 through 20-6 determine the states in accordance with state components respectively measured at the cells 6a through 6f, respectively select SON applications from the SON applications 21-26 in response to the selected states, and then cause the selected SON applications to operate. The agents 20-1 through 20-6 optimize control parameters at the cells 6a through 6f.

Each of the agents 20-1 and 20-2 selects between an operative state and an inoperative state on the SON applications 21-26 in response to the common first-value function 31-1, thereby selecting the SON application for operation. Each of the agents 20-3 and 20-4 selects between an operative state and an inoperative state on the SON applications 21-26 in response to the common first-value function 31-2, thereby selecting the SON application for operation. Each of the agents 20-5 and 20-6 selects between an operative state and an inoperative state on the SON applications 21-26 in response to the common first-value function 31-3, thereby selecting the SON application for operation.

The agent 20-1 determines a reward in response to a reward component measured at the cell 6a, and performs reinforcement learning of the first-value function 31-1 in response to the determined reward. On the other hand, the agent 20-2 determines a reward in response to a reward component measured at the cell 6b, and performs reinforcement learning of the first-value function 31-1 in response to the determined reward. In another embodiment, the learning of the first-value function 31-1 may be performed in accordance with an average value of the rewards determined by the agents 20-1 and 20-2.

Similarly, the agents 20-3 and 20-4 perform reinforcement learning of the first-value function 31-2, and the agents 20-5 and 20-6 perform reinforcement learning of the first-value function 31-3.

The learning controller 27 determines the similarity between the first-value functions 31. The learning controller 27 determines the second-value function 32 by combining the first-value functions 31 having high similarities. As illustrated in FIG. 16B, the first-value function 31-2 and the first-value function 31-3 are combined in the second-value function 32-1.

At the second stage, each agent 20 that has learned the first-value functions 31 combined into the second-value function 32 performs reinforcement learning of the second-value function 32. In accordance with the second-value function 32 into which the first-value functions 31 learned at the first stage are combined, these agents 20 select from the SON applications 21-26 the SON applications that optimize the control parameters at the cells 6.

As illustrated in FIG. 16B, the agents 20-3 through 20-6, independently of each other, determine rewards at the cells 6c through 6f, and perform reinforcement learning of the common second-value function 32-1 in response to the determined rewards. In accordance with the common second-value function 32-1 that accounts for the learning results, the agents 20-3 through 20-6 select, from the SON applications 21-26, SON applications that are performed in response to the states measured at the cells 6c through 6f.

According to the embodiment, the learning effect is further increased because the learning effect at the plurality of cells is accounted for in the common value function in the first stage of learning.

Fifth Embodiment

Figure 17:
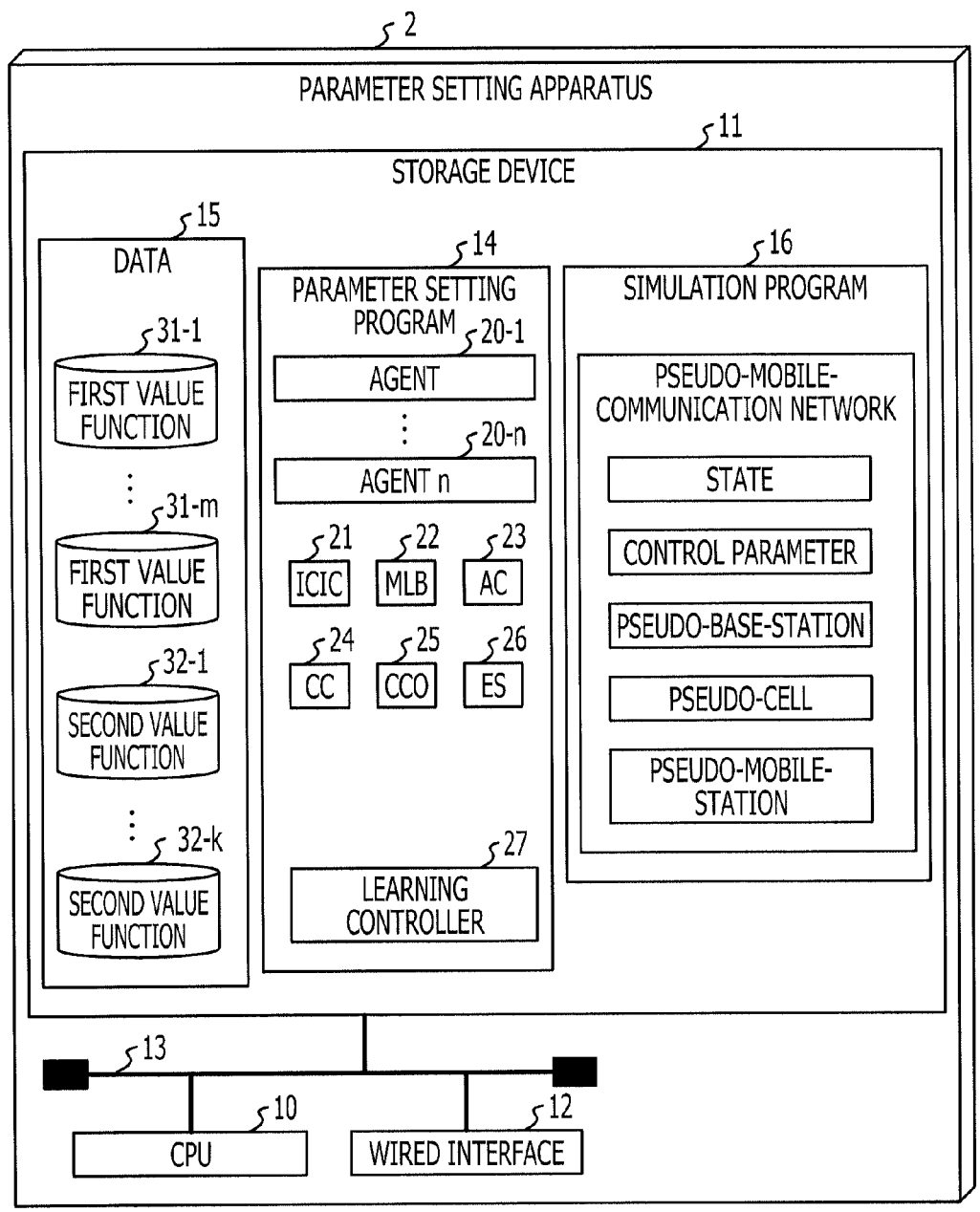
FIG. 17 illustrates a third example of the hardware configuration of the parameter setting apparatus.

A fifth embodiment is described below. According to the fifth embodiment, the first stage of learning is performed in computer simulation, and the second stage of learning is performed in an actual mobile communication network. FIG. 17 illustrates a third example of the hardware configuration of the parameter setting apparatus. In FIG. 17, elements identical to those illustrated in FIG. 8 are designated with the same reference numerals and the discussion of the functions thereof is omitted here.

The storage device 11 stores a simulation program 16. The simulation program 16 causes a program module to operate. The program module simulates a pseudo-base-station, a pseudo-cell, and a pseudo-mobile-station. With respect to a set control parameter, the simulation program then calculates a state that an actual mobile communication network is expected to take.

At a first stage of learning, the parameter setting program 14 and the agent 20 perform a learning process and an optimization process on a pseudo-mobile-communication network simulated by the simulation program 16. The simulation program 16 significantly reduces an operation time of the first stage in comparison with the learning process that is performed on the actual mobile communication network. For example, steps BA through BC of FIG. 10 may be iterated for one hour, while the same level of learning may be performed within 5 minutes if the simulation program 16 is used for computation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A parameter setting apparatus comprising:
    a memory; and
    a processor that executes a procedure stored in the memory, the procedure including,
    performing a process of selecting and executing one of a plurality of optimization operations to optimize a control parameter of a mobile communication network in accordance with a common value function, in response to a state variable in each of a plurality of different areas in the mobile communication network, the common value function determining an action value of each optimization operation responsive to the state variable of the mobile communication network,
    separately determining a reward responsive to the state variable in each of the plurality of areas, and performing reinforcement learning to update the common value function in response to the reward determined on each area, the reinforcement learning being performed independently for each of the plurality of areas.

2. The parameter setting apparatus according to claim 1, wherein the processor performs a first learning process that learns through reinforcement learning a first-value function that determines an action value of each optimization operation responsive to the state variable in each of the plurality of areas, and a combination process that determines as the common value function a second-value function resulting from combining the first-value functions learned on the areas;

wherein the processor performs, as the reinforcement learning, a second learning process that updates the common second-value function in response to the reword determined on each of the plurality of areas where the first-value functions combined into the common second-value function have been learned.

3. The parameter setting apparatus according to claim 2, wherein the processor performs a similarity determination process to determine a similarity between the first-value functions, and in the combination process, a combination determination process to determine, in response to the similarity of the first-value functions, whether to combine the first-value functions.

4. The parameter setting apparatus according to claim 3, wherein in the similarity determination process the processor determines the similarity of the first-value functions in view of the degree of match of the optimization operations providing the highest action value with respect to the identical state variable.

5. The parameter setting apparatus according to claim 4, wherein in the similarity determination process the processor determines the similarity of the first-value functions in view of a ratio of the number of state variables of the matched optimization operations providing the highest action value to the number of state variables having the action values learned in the first learning process.

6. The parameter setting apparatus according to claim 3, wherein in the combination determination process the processor determines whether to combine the first-value functions in the order from a high similarity of a combination of the first-value functions to a low similarity of a combination of the first-value functions, and wherein the processor performs a determination as to whether to combine a pair of first-value functions, and when one of the first-value functions in the pair is arranged to be combined with a third first-value function other than the other of the first-value functions in the pair, the processor performs the determination by accounting for a similarity between the other first-value function and the third first-value function.

7. The parameter setting apparatus according to claim 2, wherein in the combination process, the processor sets an average value of the action values of the first-value functions to be combined as an action value of the second-value function.

8. The parameter setting apparatus according to claim 2, wherein subsequent to the combination of the first-value functions into the second-value functions, the processor performs a process that learns through reinforcement learning the first-value functions combined into the second-value function, and a process that selects and executes one of the plurality of optimization operations in accordance with the first-value functions in the plurality of areas where the first-value functions are successively learned, wherein the processor suspends a process that selects and executes an optimization operation in accordance with the second-value function in the plurality of areas where the first-value functions are successively learned.

9. The parameter setting apparatus according to claim 8, wherein the processor performs a process that determines a similarity between the first-value functions that are combined into the second-value function, and Wherein, when the similarity satisfies a specific condition, the processor suspends the process that selects and executes the optimization operation in accordance with the second-value function, and selects and executes one of the optimization operations in accordance with the first-value function.

10. The parameter setting apparatus according to claim 2, wherein the processor performs a process that on each cell group selects and executes one of the plurality of optimization operations in response to the state variable in a cell in accordance with a common first-value function, the cell group including a plurality of cells, and a process that determines a reward responsive to the state variable in the cell, wherein in the first learning process, the processor performs reinforcement learning to update the common first-value function in response to the reward.

11. The parameter setting apparatus according to claim 10, wherein the cell group results from being sorted according to at least one of a difference in a transmission power from a base station and a difference in an installation situation.

12. The parameter setting apparatus according to claim 2, wherein the processor performs the first learning process by simulating a change in the state variable in response to a control parameter of the mobile communication network.

13. A parameter setting method comprising:

performing a process of selecting and executing one of a plurality of optimization operations to optimize a control parameter of a mobile communication network in accordance with a common value function, in response to a state variable within each of a plurality of different areas in the mobile communication network, the common value function determining an action value of each optimization operation responsive to the state variable of the mobile communication network;

separately determining a reward responsive to the state variable in each of the plurality of areas; and performing reinforcement learning to update the common value function in response to the reward determined on each area, the reinforcement learning being performed independently for each of the plurality of areas.

14. A non-transitory computer-readable recording medium storing a program that causes a computer to set a control parameter, the computer program comprising:

performing a process of selecting and executing one of a plurality of optimization operations to optimize a control parameter of a mobile communication network in accordance with a common value function, in response to a state variable in each of a plurality of different areas in the mobile communication network, the common value function determining an action value of each optimization operation responsive to the state variable of the mobile communication network;

separately determining a reward responsive to the state variable in each of the plurality of areas; and performing reinforcement learning to update the common value function in response to the reward determined on each area, the reinforcement learning being performed independently for each of the plurality of areas.

* * * * *

UNITED STATES PATENT AND TRADEMARK OFFICE
CERTIFICATE OF CORRECTION

PATENT NO. : 8,897,767 B2
APPLICATION NO. : 13/627344
DATED : November 25, 2014
INVENTOR(S) : Yuji Kojima Page 1 of 1

It is certified that error appears in the above-identified patent and that said Letters Patent is hereby corrected as shown below:

In the Claims

Column 18, line 11, in Claim 9, delete "Wherein," and insert -- wherein, --, therefor.

Signed and Sealed this
Fifth Day of May, 2015

Michelle K. Lee
*Director of the United States Patent and Trademark Office*